(12) United States Patent
Gangalakurti et al.

(10) Patent No.: US 8,332,451 B2
(45) Date of Patent: Dec. 11, 2012

(54) PROGRAMMABLE CORDIC PROCESSOR

(75) Inventors: Phanimithra Gangalakurti, Hyderabad (IN); Karthik Vaidyanathan, San Jose, CA (US); Partha Sarathy Murali, San Jose, CA (US); InduSheknar Ayyalasomayajula, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 1049 days.

(21) Appl. No.: 12/324,835

(22) Filed: Nov. 27, 2008

(65) Prior Publication Data
US 2010/0131577 A1 May 27, 2010

(51) Int. Cl.
G06F 7/38 (2006.01)
G06F 17/14 (2006.01)

(52) U.S. Cl. ........ 708/441; 708/400; 708/401; 708/402; 341/116; 341/117

(58) Field of Classification Search .................... 708/441
See application file for complete search history.

*Primary Examiner* — Henry Tsai
*Assistant Examiner* — Dean Phan
(74) *Attorney, Agent, or Firm* — File-EE-Patents.com; Jay A. Chesavage

(57) ABSTRACT

A CORDIC processor has a plurality of stages, each of the stages having a X input, Y input, a sign input, a sign output, an X output, a Y output, a mode control input having a ROTATE or VECTOR value, and a stage number k input, each CORDIC stage having a first shift generating an output by shifting the Y input k times, a second shift generating an output by shifting X input k times, a multiplexer having an output coupled to the sign input when the mode control input is ROTATE and to the sign of the Y input when the mode input is VECTOR, a first multiplier forming the product of the first shift output and the multiplexer output, a second multiplier forming the product of the second shift output and an inverted the multiplexer output, a first adder forming the X output from the sum of the first multiplier output and the X input, and a second adder forming the Y output from the sum of the second multiplier output and the Y input.

21 Claims, 12 Drawing Sheets

CORDIC Engine (3 stage pipeline)

Figure 3A
H matrix values (3x3)

| H11r | H11i | H12r | H12i | H13r | H13i |
|------|------|------|------|------|------|
| H21r | H21i | H22r | H22i | H23r | H23i |
| H31r | H31i | H32r | H32i | H33r | H33i |

Figure 3B
3x3 QR Decomposition: Input_val(source)

| CLKs | Mode | C real in | C im in | C real out | C im out | Ang_O |
|------|------|-----------|---------|------------|----------|-------|
| 0 | V | H31r(In) | H31i(In) | | | |
| 1 | R | H32r(In) | H32i(In) | | | |
| 2 | R | H33r(In) | H33i(In) | | | 414 |
| 3 | V | H21r(In) | H21i(In) | H31r | 0 | A1 |
| 4 | R | H22r(In) | H22i(In) | H32r | H32i | |
| 5 | R | H23r(In) | H23i(In) | H33r | H33i | 416 |
| 6 | V | H11r(In) | H11i(In) | H21r | 0 | A2 |
| 7 | R | H12r(In) | H12i(In) | H22r | H22i | |
| 8 | R | H13r(In) | H13i(In) | H23r | H23i | 418 |
| 9 | V | H21r(6r) | H31r(3r) | H11r | 0 | A3 |
| 10 | R | H22r(7r) | H32r(4r) | H12r | H12i | |
| 11 | R | H22i(7i) | H32i(4i) | H13r | H13i | 420 |
| 12 | R | H23r(8r) | H33r(5r) | H21r | 0 | A4 |
| 13 | R | H23i(8i) | H33i(5i) | H22r | H32r | |
| 14 | V | H11r(9) | H21r(12) | H22i | H32i | |
| 15 | R | H12r(10r) | H22r(13r) | H23r | H33r | |
| 16 | R | H12i(10i) | H22i(14r) | H23i | H33i | 422 |
| 17 | R | H13r(11r) | H23r(15r) | H11r=R11 | 0 | A5 |
| 18 | R | H13i(11i) | H23i(16r) | H12r=R12r | H22r | |
| 19 | V | H32r(13i) | H32i(14i) | H12i=R12i | H22i | |
| 20 | R | H33r(15i) | H33i(16i) | H13r=R13r | H23r | |
| (21) | (V) | | | H13i=R13i | H23i | |

Figure 3C
3x3 QR Decomposition

| CLKs | Mode | C real in | C im in | C real out | C im out | Ang_O |
|---|---|---|---|---|---|---|
| 21 | V | H22r(18i) | H22i(19i) | H13i=R13i | H23i | |
| 22 | R | H23r(20i) | H23i(21i) | H32r | 0 | A6 |
| 23 | V | | | H33r | H33i | |
| 24 | R | | | H22r | 0 | A7 |
| 25 | R | H22r(24r) | H32r(22r) | H23r | H23i | |
| 26 | | H23r(25i) | H33r(22r) | | | |
| 27 | | H23i(25i) | H33i(23i) | | | |
| 28 | | | | H22r=R22 | 0 | A8 |
| 29 | V | | | H23r=R23r | H33r | |
| 30 | | | | H23i=R23i | H33i | |
| 31 | | H33r | H33i | | | |
| 32 | | | | | | |
| 33 | | | | | | |
| 34 | | | | H33r=R33 | 0 | A9 |

Figure 3D
3x3 QRD Step 1
Mode [V R R]

$$A1 \begin{bmatrix} h11(c) & h12(c) & h13(c) \\ h21(c) & h22(c) & h23(c) \\ h31(c) & h32(c) & h33(c) \end{bmatrix}$$

Step 1: Pivot third row of matrix over its first column and rotate to vectorize real.

Figure 3E
3x3 QRD Steps 2&3
Mode [V R R]

$$\begin{matrix} A3 \\ A2 \end{matrix} \begin{bmatrix} h11(c) & h12(c) & h13(c) \\ h21(c) & h22(c) & h23(c) \\ h31(r) & h32(c) & h33(c) \end{bmatrix}$$

Step 2&3: Repeat step 1 for second and first row

Figure 3F
3x3 QRD Step 4
Mode [V R R]

$$A4 \begin{bmatrix} h11(r) & h12(c) & h13(c) \\ h21(r) & h22(c) & h23(c) \\ h31(r) & h32(c) & h33(c) \end{bmatrix}$$

Step 4: (Cross-row transformation) Pivot corresponding pairs of real & imaginary components from rows 2&3 about column 1 of their row pair (making h31r—>0)

Figure 3G
3x3 QRD Step 5
Mode [V R R]

$$A5 \begin{bmatrix} h11(r) & h12(c) & h13(c) \\ h21(r) & h22(c) & h23(c) \\ 0 & h32(c) & h33(c) \end{bmatrix}$$

Step 5: Perform cross-row transformation on rows 1&2.

Figure 3H
3x3 QRD end of step 5

$$\begin{bmatrix} h11(r) & h12(c) & h13(c) \\ 0 & h22(c) & h23(c) \\ 0 & h32(c) & h33(c) \end{bmatrix}$$

Result after step 5.

Figure 3I
3x3 QRD Steps 6&7
Mode [V R]

$$\begin{bmatrix} h11(r) & h12(c) & h13(c) \\ 0 & \boxed{h22(c) \quad h23(c)} & A7 \\ 0 & \boxed{h32(c) \quad h33(c)} & A6 \end{bmatrix}$$

Step 6: Pivot row 3: VECTOR mode on h32(c) to get A6, ROTATE mode h33(c) by A6;
Step 7: pivot row 2: VECTOR mode on h22(c) to get A7, ROTATE mode h23(c) by A7.

Figure 3J
3x3 QRD Step 8
Mode [V R R]

$$\begin{bmatrix} h11(r) & h12(c) & h13(c) \\ 0 & \boxed{h22(r)} & \boxed{h23(r)}+\boxed{h23(i)} \\ 0 & \boxed{h32(r)} & \boxed{h33(r)}+\boxed{h33(i)} \end{bmatrix} A8$$

Step 8: Cross-row transformation on dashed-line elements to zero h32(r):
VECTOR (h22(r), h32(r)) and get A8, ROTATE (h23(r),h33(r)); (h23(i),h33(i)) by A8.

Figure 3K
3x3 QRD Step 9
Mode [V]

$$\begin{bmatrix} h11(r) & h12(c) & h13(c) \\ 0 & h22(r) & h23(c) \\ 0 & 0 & \boxed{h33(c)} \end{bmatrix} A9$$

Step 9: VECTOR element h33 and get (unused) A9

Figure 3L
3x3 QRD Step 3
Mode [V]

$$\begin{bmatrix} h11(r) & h12(c) & h13(c) \\ 0 & h22(r) & h23(c) \\ 0 & 0 & h33(r) \end{bmatrix}$$

Step 7: Repeat step 1 on h33(c)

Figure 3M $$\begin{bmatrix} R11=h11(r) & R12=h12(c) & R13=h13(c) \\ 0 & R22=h22(r) & R23=h23(c) \\ 0 & 0 & R33=h33(r) \end{bmatrix}$$

Corresponding R matrix values: Row 1 from end of step 5, row 2 from end of step 8, row 3 from end of step 9.

Figure 4A
row 3 VECTOR mode example $$400 \diagdown \begin{bmatrix} h11(c) & h12(c) & h13(c) \\ h21(c) & h22(c) & h23(c) \\ A1 \; \lvert h31(c) \rvert & h32(c) & h33(c) \end{bmatrix}$$

Step 1: Vector Mode: CORDIC rotates h31(c) to real axis and determines angle A1.

Figure 4B
row 3 before transformation

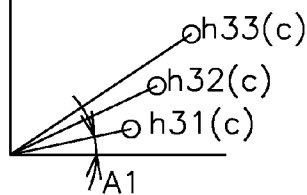

Figure 4C
row 3 ROTATE mode example $$\begin{bmatrix} h11(c) & h12(c) & h13(c) \\ h21(c) & h22(c) & h23(c) \\ h31(r) & h32(c) & h33(c) \end{bmatrix}$$

Steps 2&3: Rotate mode: Rotate h32c & h33c by A1.

Figure 4D
row 3 after rotation by A1

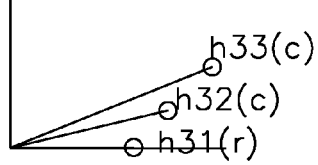

Figure 4E
Cross-row transformation (rows 2&3)

$$A4 \begin{bmatrix} h11(r) & h12(c) & h13(c) \\ h21(r) & h22(c) & h23(c) \\ h31(r) & h32(c) & h33(c) \end{bmatrix}$$

Step 4: transform by rotating pairs of real and imaginary components of adjacent rows. Imaginary parts of first row were zeroed, leaving 5 pairs to rotate:
(h21r,h31r) — returns angle A4;
Then rotate by angle A4:
h22(r),h32(r);
h22(i),h32(i);
h23(r),h33(r);
h23(i),h33(i)

Figure 4F
Cross-row transformation data organization

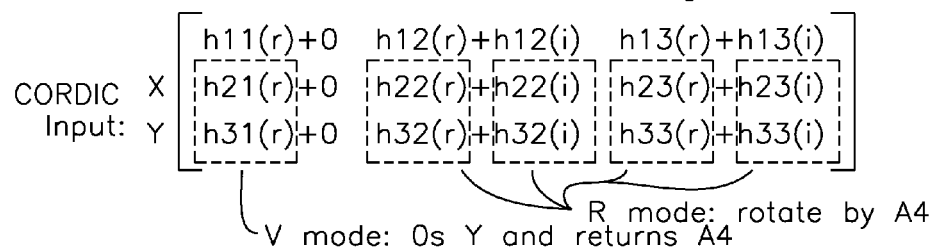

Figure 4G
1) Rotate h21(r)+jh31(r) until h31(r) —> 0 and get angle A4
2) Rotate by angle A4:
h22(r),h32(r);
(h22i,h32(i);
h23(r),h33(r);
h23(i),h33(i)

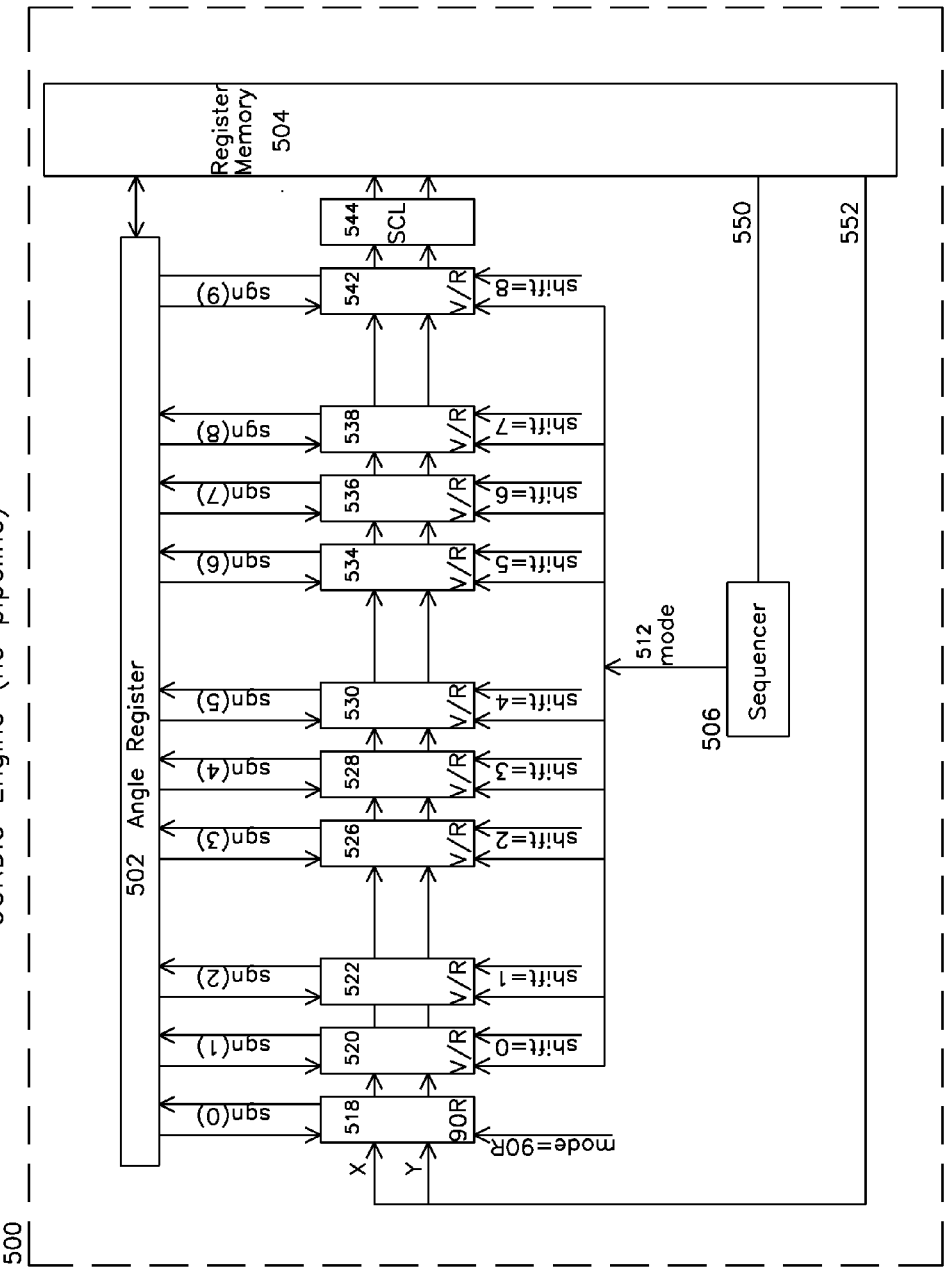

CORDIC Engine (single stage with re-use)

CORDIC Engine (3-stage re-use)

PROGRAMMABLE CORDIC PROCESSOR

FIELD OF THE INVENTION

The present invention relates to a COordinate Rotation DIgital Computer (CORDIC). In particular, the present invention provides a flexible and programmable architecture for pipelined computation including determining the angle or rotation A required to zero a Y component, and rotation of orthogonal vectors by the angle A previously determined to provide a unitary transformation for a matrix.

BACKGROUND OF THE INVENTION

The CORDIC was first described in the September 1959 issue of IRE Transactions on Electronic Computers in an article titled "CORDIC Computing Technique". Methods of implementing CORDIC processors are described in U.S. Pat. No. 4,910,698 by McCartney, U.S. Pat. No. 6,945,505 by Wiener, U.S. Pat. No. 7,046,269 by Wu et al.

Channel and symbol processing for wireless multiple input multiple output (MIMO) requires the repetitive computation of matrix values. One such computation is known as a QR Decomposition, whereby a Q matrix and an R matrix are computed where H=Q*R and R is an upper triangular matrix. A related computation once Q is computed is a $Q^H*Y$ multiplication, where the matrix of received symbols from each receiver Y multiplied by the hermitian of Q, or $Q^H*Y$. Another matrix computation is the single value decomposition, known as SVD, which decomposes a matrix into a left-unitary matrix.

Prior art MIMO systems implement channel processing computations using the algorithm known as Modified Gram Schmidt, or the Householder transformation, both of which perform orthogonal matrix transformation and require complex multipliers and arithmetic engines. A computational method often employed in CORDIC processors is Given's algorithm.

OBJECTS OF THE INVENTION

A first object of this invention is a CORDIC processing stage which accepts an X input, a Y input, a stage number, and a mode input, and generates an X output and a Y output, where a first shifter is coupled to the Y input and generates an output shifted by the stage number, a second shifter is coupled to the X input and generates an output shifted by the stage number, a multiplexer generates an output coupled to a sign of the Y input when the mode input is VECTOR and the multiplexer output is coupled to a sign input when the mode input is ROTATE, a first multiplier forms the product of the multiplexer output and the first shifter output, the first multiplier output added to the X stage input to form the X stage output, a second multiplier forms the product of the second shifter output and the inverted multiplexer output, the second multiplier output coupled to a second adder which forms the Y output by adding the Y input to the second multiplier output.

A second object of the invention is a CORDIC processor formed from a plurality of register stages coupled together, each register stage accepting a mode input, a sign input, the X and Y inputs from either a previous stage or a pipeline register, the stages inputs and outputs coupled to a register memory which selects register values under the control of a sequencer, the stages operative to mode control levels generated by a mode controller.

A third object of the invention is a QR transformation engine for performing QR decomposition of an H matrix into an upper right triangular matrix using unitary transformations provided by a CORDIC processor.

A fourth object of the invention is a CORDIC processor with stage re-use formed by one or more CORDIC stages, each CORDIC stage provided with a programmable stage number, where the input of a first stage generates an output of a last stage, which last stage output is repetitively coupled to the first stage input until a computation is complete.

SUMMARY OF THE INVENTION

The present invention describes a programmable multi-stage pipelined CORDIC processor architecture which is useful for applying orthogonal transformations on matrices formulated as part of signal processing in MIMO systems. While described in the present examples for use in MIMO signal processing, the invention may be used for any mathematical computation involving operations on analytic values which may be represented with real and imaginary parts, or in polar notation.

In an aspect of the present invention, a method such as Given's rotation method can be used in combination with a specialized and novel pipelined architecture to provide a general purpose programmable CORDIC computational machine. The programmable architecture can be extended to multiple applications, and matrix sizes of any input, which has tremendous advantages over a custom architecture which may solve only one class of CORDIC computation. The present architecture is suitable for solving linear equations in matrix notation by application of orthogonal transformations, which are of particular interest in MIMO signal processing, which include QR-decomposition, SVD-computation, matrix compression/expansion, unitary matrix multiplication (Q*Y), and the like.

The present invention is a programmable CORDIC processor for the iterative computation of rectangular and polar values. The CORDIC processor has a plurality of CORDIC stages, each CORDIC stage having an X input and a Y input, and generating an X output and a Y output. Each CORDIC stage also accepts a mode control input with the value ROTATE or VECTOR (also known as a ROTATE/VECTOR select input). Each CORDIC stage also has a sign input (sgn_i (k)) and generates a sign output (sgn_o(k)). The X input is coupled to a first adder input and also to a first shift(k) function input. The Y input is coupled to a second shift(k) function input, a second adder input, and also a sign function input. The first and second shift functions each generate an output which is shifted k times, where k is the stage number, and the sign function generates +1 for any value greater than or equal to 0, and −1 for any values less than 0, thereby also producing the sgn_o signal for the present stage. A first multiplier generates the product of the second shift function output and a multiplexer output, and the output of the first multiplier is fed to the first adder input. A second multiplier accepts an output from the first shift output and the inverted output of the multiplexer. The multiplexer is coupled to the ROTATE/VECTOR select input, and the output of the first adder generates the X output. When the multiplexer select input is ROTATE, the output of the multiplexer is the value of a sgn_i(k) input, and when the multiplexer select input is VECTOR, the output of the multiplexer is coupled to the output of the sign function.

In one example embodiment of the invention, a plurality of CORDIC stages from 1 to k are sequentially coupled to each other, the X and Y outputs of a kth stage coupled to the respective X and Y inputs of the subsequent stage. The first stage inputs are provided by a register memory and the last stage outputs are coupled to the register memory. The shift(k) input for each stage is coupled to the stage number k, such that the first stage performs a shift by 1, and the kth stage performs a shift by k. A stage mode controller generates the rotate/vector mode input for each stage, and a vector angle register generates the sgn_i(k) input and accepts the sgn_o(k) output for each stage.

In another example embodiment of the invention, a CORDIC engine has a plurality of stages having X and Y outputs coupled to a successive stage X and Y inputs, each stage functioning as described earlier, the first stage in 90R mode and coupled to a second stage with programmable mode, the second stage coupled to a third stage, which is coupled to a first register, and the first and second stage mode control inputs are connected to an S1_mode output from the mode controller. The first register output is coupled to a fourth stage which is coupled to a fifth stage, which is coupled to a sixth stage, which is coupled to a second register. The fourth, fifth, and sixth stage modes are controlled by an S2_mode output from the mode controller. The second register output is coupled to a seventh stage, which is coupled to an eighth stage, which is coupled to a ninth stage, which is coupled to a third register. The seventh, eighth, and ninth stage modes are controlled by an S3_mode output from the mode controller. The third register output is coupled to a tenth stage controlled by an S4_which is coupled to a scaling stage which is coupled to register memory.

In another example embodiment of the invention, a CORDIC engine performs matrix transformation such as QR decomposition by transforming an H matrix into an upper right triangular matrix. The CORDIC engine has a vector mode which accepts an X and Y input and zeros the Y component by vector rotation and also determines the angle of rotation required to zero the Y component. The CORDIC engine has a rotation mode which rotates an X and Y input by a given input angle A. In a first step of H matrix transformation, the CORDIC engine accepts an H matrix and performs unitary transformations by rotating each complete row by an angle sufficient to reduce the imaginary component of the first column element to 0. The CORDIC engine then performs a "cross-row transformation" by forming an X and Y input from the column values of adjacent rows, rotating the first column pair sufficient to make the lower row value 0 and generating an angle A4. The remaining real components within a column of adjacent rows are formed into real (X, Y) pairs and are rotated by this angle A4, as are the remaining imaginary components (X, Y) from a particular column of adjacent rows. After performing this "cross-row transformation", the lower first element of the row pair is zeroed. This same "cross-row transformation" is performed on the remaining rows, as well as row rotation, until an upper right triangular matrix is formed, thereby completing the QR decomposition.

BRIEF DESCRIPTION OF THE DRAWINGS

FIG. 3A shows a 3×3 H matrix.

FIGS. 3B and 3C show a series of computations for a QR decomposition of the H matrix of FIG. 3A.

FIGS. 3D, 3E, 3F, 3G, 3H, 3I, 3J, 3K, 3L, and 3M show the matrix transformations performed by the CORDIC engine of FIG. 2.

FIGS. 4A, 4B, 4C and 4D show details of a row rotation for QR decomposition.

FIGS. 4E, 4F and 4G show details for a cross-row transformation for QR decomposition.

FIG. 5 shows a block diagram for a CORDIC engine having no pipeline stages.

DETAILED DESCRIPTION OF THE INVENTION

Figure 1A:
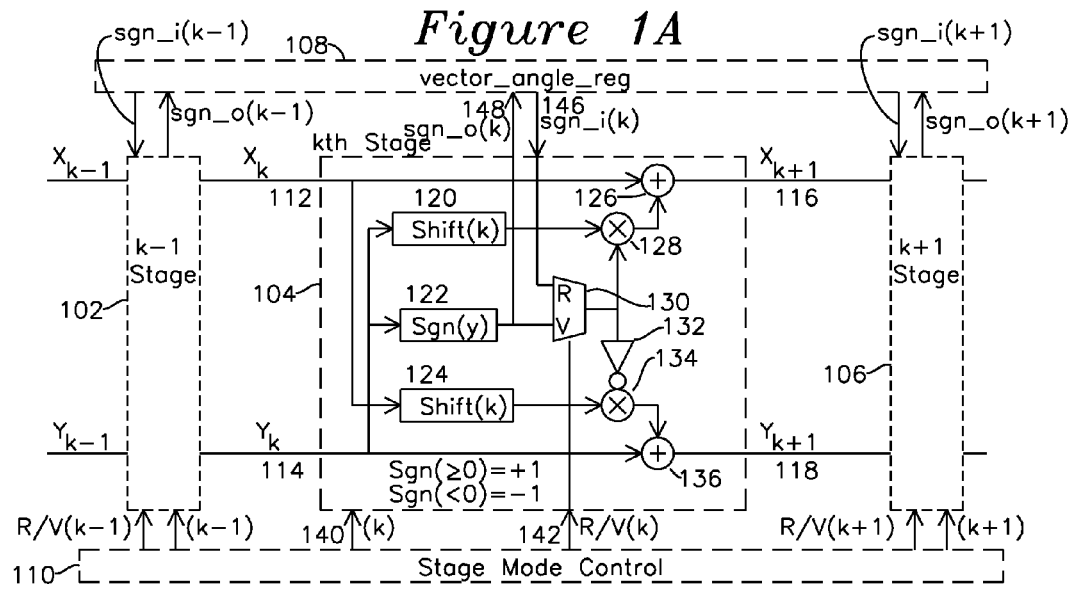
FIG. 1A shows a block diagram for one stage of a coordinate rotation computer.

One algorithm used for complex Cartesian coordinate plane rotation is known as Given's algorithm, where a rotation of a vector having coordinates (x, y) by an angle 'a' results in new coordinates $(x^1, y^1)$:

$$\begin{bmatrix} x^1 \\ y^1 \end{bmatrix} = \begin{bmatrix} \cos a & \sin a \\ -\sin a & \cos a \end{bmatrix} * \begin{bmatrix} x \\ y \end{bmatrix} \quad (A.1)$$

$$\Rightarrow \begin{bmatrix} x^1 \\ y^1 \end{bmatrix} = \begin{bmatrix} x\cos a + y\sin a \\ -x\sin a + y\cos a \end{bmatrix} \quad (A.2)$$

The above equations can be extended for a complex matrix:

$$\begin{bmatrix} x^1 & h^1 + j*k^1 \\ y^1 & p^1 + j*q^1 \end{bmatrix} = \begin{bmatrix} \cos a & \sin a \\ -\sin a & \cos a \end{bmatrix} * \begin{bmatrix} x & h + j*k \\ y & p + j*q \end{bmatrix} \quad (A.3)$$

Resulting in:

$$\begin{bmatrix} x^1 & h^1 + j*k^1 \\ y^1 & p^1 + j*q^1 \end{bmatrix} = \quad (A.4)$$

$$\begin{bmatrix} x\cos a + y\sin a & (h\cos a + p\sin a) + j*(k\cos a + q\sin a) \\ -x\sin a + y\cos a & (-h\sin a + p\cos a) + j*(-k\sin a + q\cos a) \end{bmatrix}$$

It can be seen from the above result that the complex values of the second column are complex combination of real and imaginary outputs, independently, of CORDIC rotations on (h+j*p) and (k+j*q) as applied on (x+j*y). This property can be extended to any number of columns in the matrix, and is described herein as "cross-row transformations".

Another type of transformation is described herein as an "over-the-row transformation", which is employed to ensure that transformation on one coefficient of the linear equation is extended to all the coefficients to retain equation consistency.

$$\begin{bmatrix} \sqrt{a^2 + b^2} & h' + j*k' \\ x + j*y & p + j*q \end{bmatrix} = \begin{bmatrix} e^{-j*\text{atan}(b/a)} & 0 \\ 0 & 1 \end{bmatrix} * \begin{bmatrix} a + j*b & h + j*k \\ x + j*y & p + j*q \end{bmatrix}$$

where (h'+j*p') is mathematically (h+j*p)*$e^{-j*a\ tan(b/a)}$

In order to facilitate these two basic operations of "cross-row transformations" and "over-the-row-transformations", a CORDIC engine having a plurality of stages is described, where each individual stage can be operated in either VECTOR or ROTATE modes. VECTOR mode can be interpreted as a Cartesian complex plane rotation to orient the vector along the positive X-axis. It should be noted that alignment along the positive x-axis is a constraint which is applied for clarity of operation and to ensure the uniqueness of the solution, but the operation of the CORDIC engine may be modified to enable rotation to the positive or negative x or y axis. In the present examples, rotation to the positive X axis is described.

In VECTOR mode, as derived from equation (A.2)

$$\begin{bmatrix} x^1 \\ y^1 \end{bmatrix} = \begin{bmatrix} x\cos a + y\sin a \\ -x\sin a + y\cos a \end{bmatrix} \quad (B.1)$$

Aligning the resulting vector along positive X-axis through the selection of the required angle 'a' drives $y^1$ to 0, as shown below:

$$\begin{bmatrix} x^1 \\ 0 \end{bmatrix} = \begin{bmatrix} x\cos a + y\sin a \\ -x\sin a + y\cos a \end{bmatrix} \quad (B.2)$$

where the CORDIC engine provides the required angle a, to cause y1=0, and this angle 'a' is vector_angle_reg, as will be described.

Alternatively described in polar form, the complex value (x+j*y) is $x^1 e^{ja}$, such that $x^1 = \sqrt{x^2+y^2}$ and $$a = a\tan\left(\frac{y}{x}\right).$$

FIG. 1 shows a plurality of CORDIC stage 102, 104, 106, with a particular CORDIC stage 104 shown in detail. Each CORDIC stage 104 either generates a single bit value part of an angle 148 in a VECTOR mode, which bits may be aggregated together in vector_angle_reg 108, or the stage accepts a single bit value of an angle 146 from angle_reg_108 which was previously computed in a VECTOR mode, which is then used in a subsequent ROTATE mode to rotate (x, y) input by this angle. CORDIC stage 104 has an X input 112 and a Y input 114, and generates an X output 116 and a Y output 118. In a sequence of CORDIC stages, a kth 104 has X 112 and Y 114 inputs fed from a preceding (k−1) stage, and also generates outputs X 116 and Y 118 to a succeeding (k+1) stage 106. Each CORDIC stage also accepts a k input 140 representing the stage number and a mode control input 142 with the value ROTATE or VECTOR (also known as a ROTATE/VECTOR select input).

The CORDIC stage 140 can be used in a ROTATE or VECTOR mode, and each stage can have a variety of different configurations. In a non-pipelined, zero re-use embodiment of the invention shown in FIG. 5, each stage has a fixed stage number, which implies a fixed shift function 120, 124 of FIG. 1A, which may be accomplished by merely selecting the corresponding x or y input bits shifted by the fixed stage number (k=1 for stage 522, for example). In a single-stage re-use configuration shown in FIG. 6, a single stage 104 is used in a separate time interval for each of the k-stages, and the stage k input is provided 640. This configuration requires that the shifters 120 and 124 shift associated (x, y) inputs by a variable amount determined by k at the start of each operation.

Each CORDIC stage also generates sign output (sgn_o(k)) 148 indicating the kth (stage number) position amount of angle rotation computed during a VECTOR mode, and also receives a sign input (sgn_i(k)) 146 indicating a kth (stage number) bit of rotation during a ROTATE mode. For a particular stage k, shown in FIG. 1A, the X input 112 is coupled to a first adder 126 input and also to a first shift(k) function 124 input. The Y input 114 is coupled to a second shift(k) function 120 input, a second adder 136 input, and also a sign function 122 input. The first shift function 124 and second shift function 120 each generate an output which is shifted k times, where k is the stage number 140, and the sign function 122 generates +1 output for any input value greater than or equal to 0, and −1 output for any input value less than 0. A first multiplier 128 generates the product of the second shift function 120 output and a multiplexer 130 output, and the output of the first multiplier 128 is fed to first adder 126 input. A second multiplier 134 accepts an output from the first shift 124 output and the inverted 132 output of the multiplexer 130. As the first and second multipliers are performing a multiplication by a single bit +1 or −1 value, the multiplication may be simplified to the identity function (no operation) when multiplying by +1 and a 2's compliment inversion when multiplying by −1. The 2's compliment may be formed, for example, by inverting all the bits of the value and providing an input carry 1 for the LSB of the full adder stage. The architecture of this embodiment therefore only requires inverters and adders in each stage. The multiplexer 130 is coupled to the ROTATE/VECTOR select input 142, and the output of the first adder 126 generates the X output 116. When the multiplexer mode select input 142 is ROTATE, the output of the multiplexer 130 is the value of a sgn_i(k) input 146, and when the multiplexer mode select input is VECTOR, the output of the multiplexer 130 is coupled to the output of the sign function 122, which also generates the sgn_o(k) signal for the current k stage.

Figure 1B:
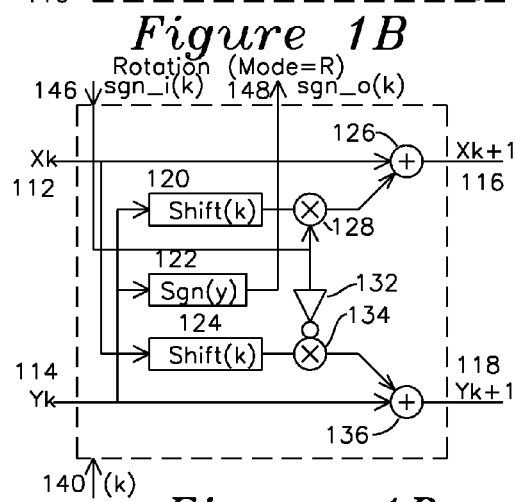
FIG. 1B shows a block diagram for the stage of FIG. 1A in rotation mode.
Figure 1C:
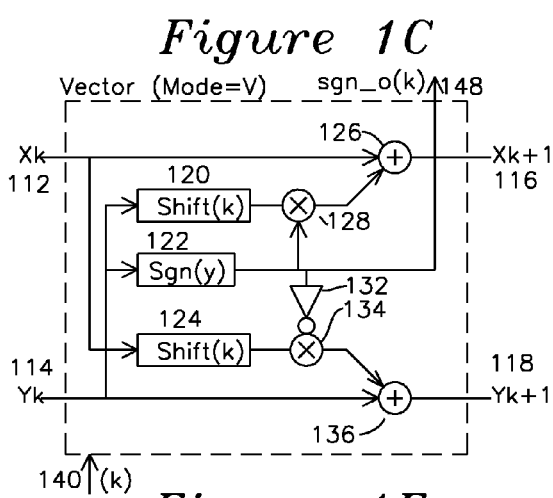
FIG. 1C shows a block diagram for the stage of FIG. 1A in vector mode.
Figure 1D:
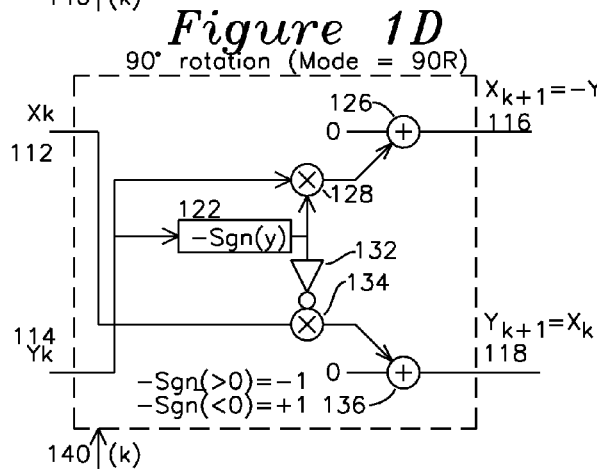
FIG. 1D shows a block diagram for the stage of FIG. 1A in 90-degree rotation mode.

FIG. 1B through FIG. 1D show the functionality of a typical stage such as 104 of FIG. 1A shown for a variety of modes. FIG. 1B shows a stage where the mode input 142 (not shown) is set to ROTATE. The k input 140 determines the number of shifts performed by Shift(k) 120 and 124 on Y and X, respectively. For this configuration, sgn_o(k) is coupled to sgn_i(k), and the unused sgn(y) function 122 and unused mux 130 are not shown for clarity. Sgn_i(k) 146 and sgn_o(k) 148 are provided to vector_angle_reg 108, which accepts as an input via the various sgn_i(k) registers an angle specified in units which can be converted with the use of a conversion table to fractional radians. FIG. 1C shows the stage configuration for vector mode where mode select input 142 (not shown) selects VECTOR. FIG. 1D shows the stage 104 with the mode input set for 90 degree rotation (90R) mode. For this special mode, the X input value is multiplied by +sgn(Y) to form the Y output value, and the Y input value is multiplied by −sgn(y) to from the X output.

Figure 1E:
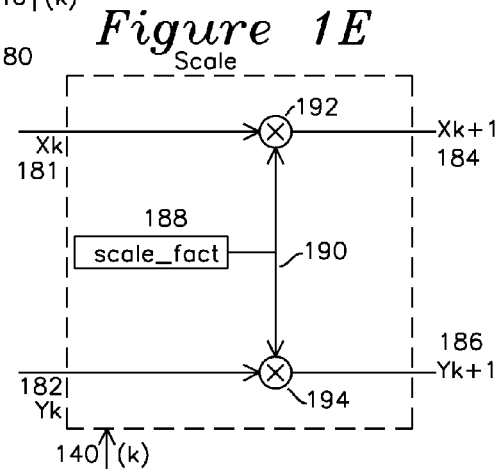
FIG. 1E shows a block diagram for a scale stage.

FIG. 1E shows a scale function 180, whereby the X input 181 and Y input 182 are multiplied by scaling factor 188 with multipliers 192, 194, respectively, to generate outputs 184, 186, respectively.

In a non-pipelined, no-reuse embodiment of the invention shown in FIG. 5, a plurality of CORDIC stages from 1 to k are sequentially coupled to each other, the X and Y outputs of a kth stage coupled to the respective X and Y inputs of the subsequent stage, as also shown in FIG. 1A. The first stage 518 inputs of FIG. 5 are provided by a register memory 504 location selected by the sequencer 506 and the last stage 544 outputs are coupled to the register memory 504 location also selected by the sequencer 506. The shift=k stage number input for each stage is coupled to a constant, such that the first stage performs a shift by 1, and the kth stage performs a shift by k, each stage performing the shift by remapping input bits as described earlier. A sequencer 506 generates the rotate/vector mode input for each stage, and a vector angle register 502 generates the sgn_i(k) input and accepts the sgn_o(k) output for each stage. The result of a VECTOR mode operation is the storage of the resultant angle in the angle register 502, and this angle is then returned to each respective stage in a subsequent ROTATE mode operation. The angle register 502 contents may optionally be initialized by or saved into register memory 504 selected by the sequencer 506.

Figure 2:
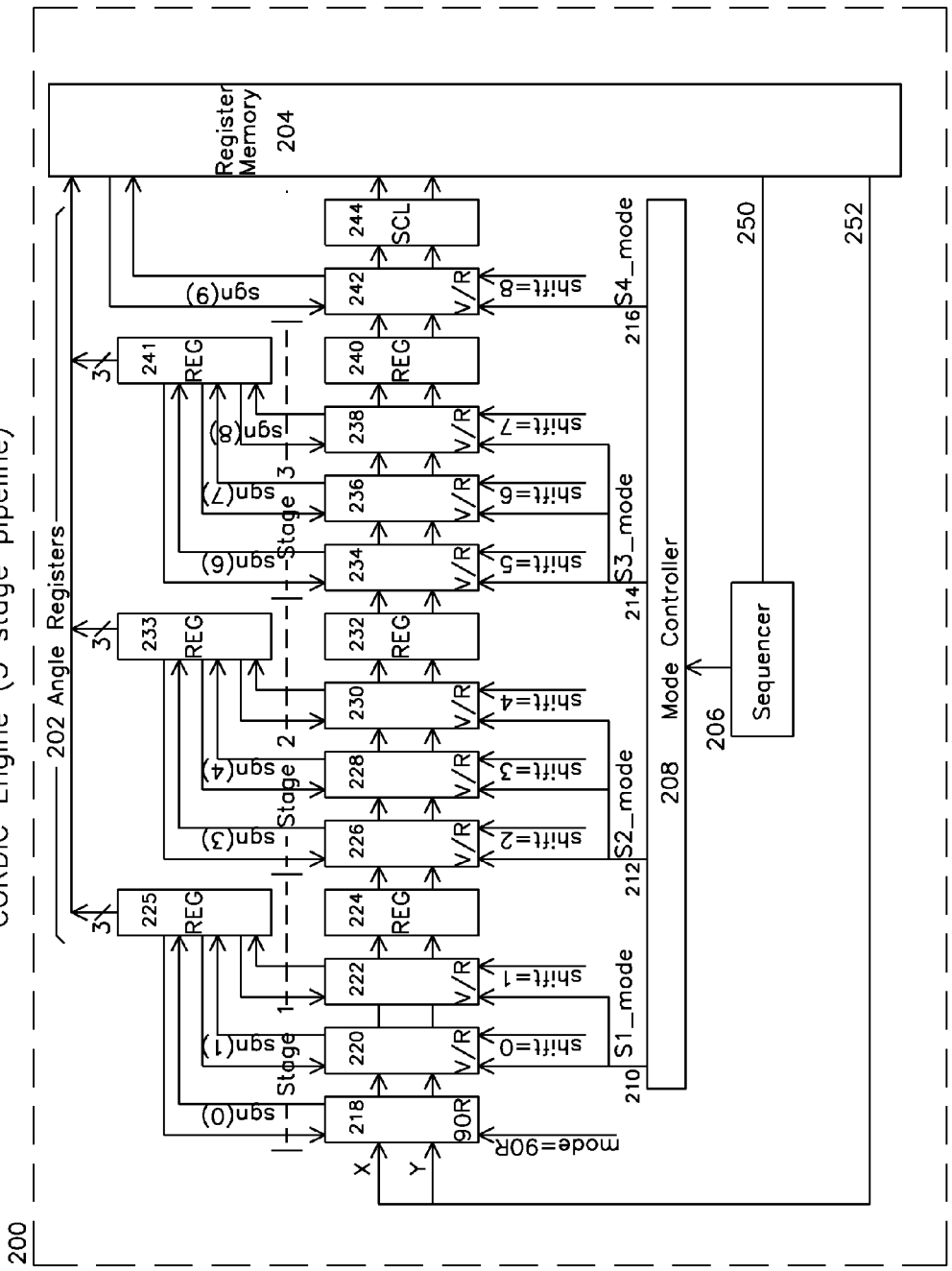
FIG. 2 shows a block diagram for a CORDIC engine formed from the stages of FIG. 1A.

In a pipelined example embodiment of the invention shown in FIG. 2, a CORDIC engine has a plurality of stages 218, 220, 222, etc, as described in FIGS. 1A through 1E. Each successive stage X and Y output is coupled to a successive stage X and Y input, each stage functioning as described in FIG. 1A. The first stage 218 is in 90R mode and coupled to a second stage 220 with programmable mode, the second stage coupled to a third stage 222, which is coupled to a first register 224, and the first and second stage mode control inputs 210 are connected to an S1_mode output from the mode controller 208. The first register 224 output is coupled to a fourth stage 226 which is coupled to a fifth stage 228, which is coupled to a sixth stage 230, which is coupled to a second register 232. The fourth stage 226, fifth stage 228, and sixth stage 230 mode inputs are controlled by an S2_mode output 212 from the mode controller 208. The second register 232 output is coupled to a seventh stage 234, which is coupled to an eighth stage 236, which is coupled to a ninth stage 238, which is coupled to a third register 240. The seventh stage 234, eighth stage 236, and ninth stage 238 modes are controlled by an S3_mode output 214 from the mode controller 208. The third register 240 output is coupled to a tenth stage 242 controlled by S4_mode 216_which is coupled to a scaling stage 244 which is coupled to register memory 204. A sequencer 206 arranges the mode control signals 210, 212, 214, 216. The sequencer 206 also controls the register memory 204 locations which are coupled to first stage 218, as well as the register memory 204 locations for storing the output of the last stage 244, and the output of the angle register 202, which generates a discrete linear angle in the binary form: $\{s_0, s_1, s_2, \ldots s_k\}$ such that the angle $\theta$ in radians is obtained as $$\theta = [s_0 * \pi/2 + s_1 * a\tan(\tfrac{1}{2}) + s_2 * a\tan(\tfrac{1}{2}^2) + \ldots + s_k * a\tan(\tfrac{1}{2}^k)]$$

Figure 6:
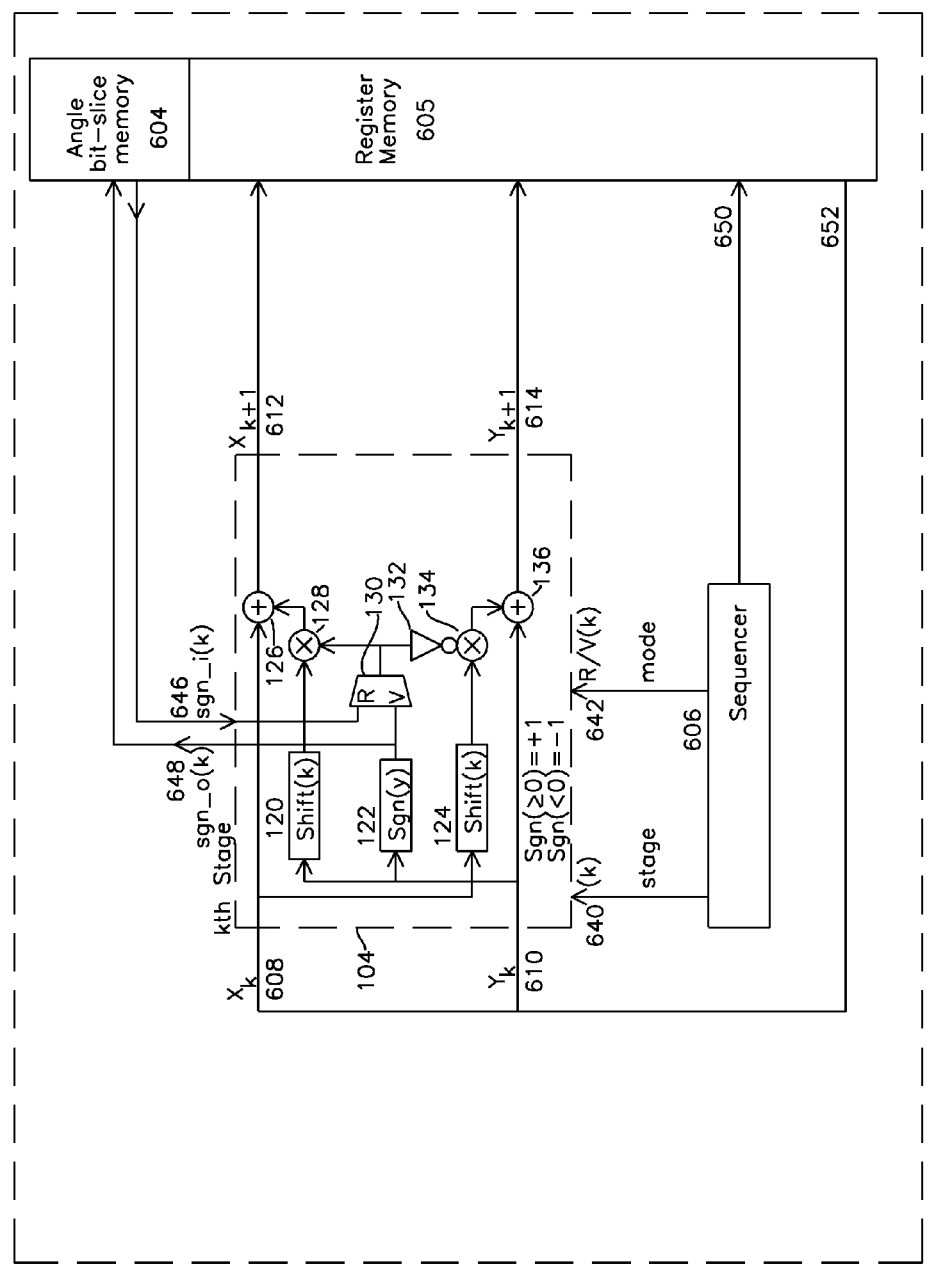
FIG. 6 shows a block diagram for a single stage CORDIC engine with re-use.

FIG. 6 shows another embodiment of the invention, where a single CORDIC engine 104 is coupled to a register memory 605, and angle bit-slice memory 604, where a single stage 104 is re-used to perform the operation of each separate stage. In one re-use example, the stage number 640 is set to 0, and an (x, y) value is presented to inputs 608, 610. In VECTOR mode, the computed stage number bit k for the angle is output 648, and in ROTATE mode, the associated bit for the stage number k is input 604. The (x, y) output values for the stage are temporarily stored in register memory 605 and recirculated back to the inputs 608, 610 for the subsequent computation. The final x, y output values for the final stage are saved in register memory 605, and the sequencer 606 handles the addressing of register memory 605 for the (x, y) inputs and outputs, and also manages the angle bit-slice memory 604, as well as the stage number k 640 and mode 606.

Figure 7:
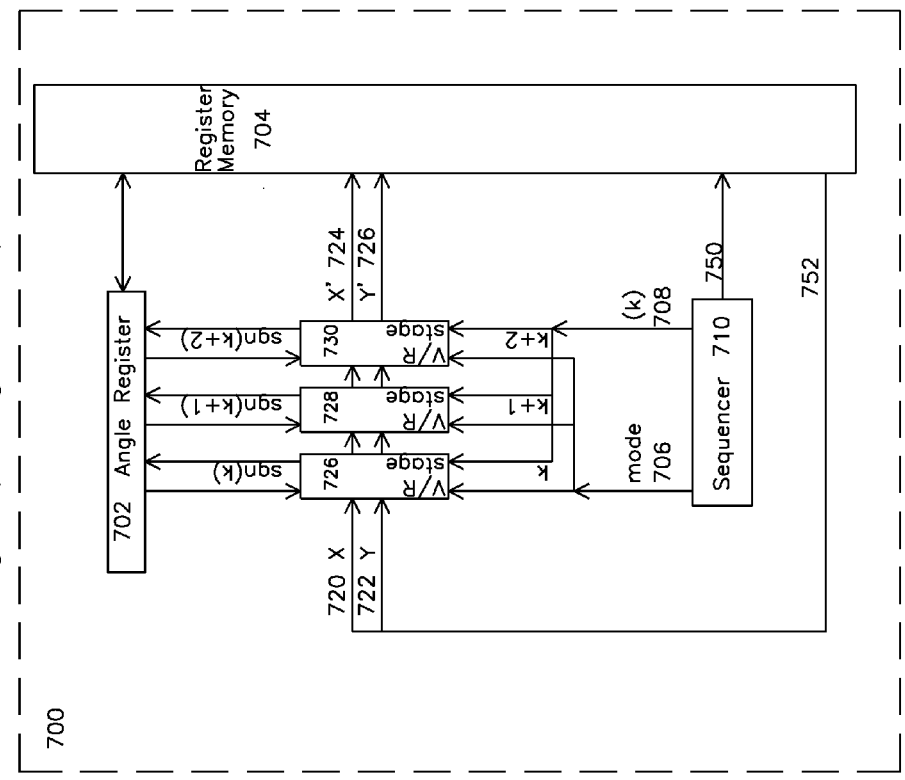
FIG. 7 shows a block diagram for a three stage CORDIC engine with re-use.

FIG. 7 shows another embodiment of the CORDIC engine as with three stages in a re-use configuration. As was described for FIGS. 5 and 6, sequencer 710 generates mode 706 for three stages (which is typically the same VECTOR or ROTATE value for a particular calculation) and stage numbers (k, k+1, k+2) for the three stages 726, 728, 730, each stage organized as was described for FIG. 1, and k incrementing by 3 on each iteration. In this manner, stage 0, 1, 2 calculations are done on a first step, with the angular output bits saved in register memory 704, followed by a subsequent calculation with outputs 724, 726 temporarily stored and circulated back to input 720, 722, which are used for the next 3 stages of calculations. A calculation on a particular value proceeds in this manner, with the mode inputs set to ROTATE or VECTOR for the duration of a calculation, and the stage number incrementing by the number of stages (three) on each iteration. Register memory 704 saves temporary values X' 724, Y' 726 for circulation back to input 720, 722 during each calculation, with the final (X', Y') result stored in an associated register 704 location. Similarly, vector angles during a VECTOR mode operation are saved 3 bits at a time into register memory 704, and these are recovered for corresponding ROTATE operations which follow on later operations.

The embodiments of FIGS. 1A and 2 can be used to implement various crucial operations required for channel processing in MIMO communication systems, such as equalization (by QR decomposition, phase & magnitude equalization), SVD computation, unitary matrix computation, and the like.

In the embodiment shown in FIG. 2, periodic synchronous pipeline registers 224, 232, and 240 are shown placed in the sequence of first through tenth CORDIC stages 218, 220, 222, 226, 228, 230, 234, 238, 242, 244. As the CORDIC stages are asynchronous (without clocked register elements), the pipeline registers 224, 232, 240 are placed in the chain to allow faster clock throughput, as is known to one skilled in the art. For example, if the propagation time for each CORDIC stage is 50 ns and the setup time for the register receiving the final result is 10 ns, then the maximum throughput clock rate would be 10*50 ns+10 ns=510 ns or 19.6 Mhz. By inserting the three pipeline registers 224, 232, 240, with a maximum of 3 CORDIC stage delays, the maximum throughput is increased to 3×50 ns+10 ns=160 ns or 62.5 Mhz. As is known with pipelined systems, this does provide the additional complexity of splitting results across multiple registers. For example, the angle register 202 must reassemble the results for each stage of calculation. In the example shown in FIG. 2, angle register 202 contains values for a current calculation, and the two preceding calculations.

The sequencer 206 selects the particular register values 204 which may be applied to the CORDIC, and the sequencer 206 also generates the commands used by the mode controller 208 and selects the storage locations for results from the final stage 244, which results are placed into register memory 204 as final results, or as intermediate results used in subsequent computations. The CORDIC processor stages operating in conjunction with the mode sequencer provide a flexible and wide-ranging set of operations. One example configuration shown is a QR Decomposition (QRD), whereby an H matrix is transformed into an upper triangular matrix with real elements along the main diagonal.

FIGS. 3A through 3H show an example embodiment QRD processor for a 3×3 channel, with the H matrix to be transformed indicated in FIG. 3A. The QRD computation may be understood in combination with the following equations, where, because of the large number of individual transformation steps, each matrix element is shown maintaining the same subscript notation through each transformation.

Original matrix:

$$\begin{bmatrix} h_{11r} + j*h_{11i} & h_{12r} + j*h_{12i} & h_{13r} + j*h_{13i} \\ h_{21r} + j*h_{21i} & h_{22r} + j*h_{22i} & h_{23r} + j*h_{23i} \\ h_{31r} + j*h_{31i} & h_{32r} + j*h_{32i} & h_{33r} + j*h_{33i} \end{bmatrix} \quad (1)$$

After rotation of each row (referred to as "row rotation", whereby (x, y) is formed from the real and imaginary components of the first column element of the row and rotated until only the real component remains, also returning the angle A, and thereafter rotating the (x, y) corresponding to the (real, imaginary) components of the other elements of the row by the angle A, thereby removing the imaginary component of the first column element of the row:

$$\begin{bmatrix} h_{11r} & h_{12r} + j*h_{12i} & h_{13r} + j*h_{13i} \\ h_{21r} & h_{22r} + j*h_{22i} & h_{23r} + j*h_{23i} \\ h_{31r} & h_{32r} + j*h_{32i} & h_{33r} + j*h_{33i} \end{bmatrix} \quad (2)$$

After a "cross-row transformation", whereby (x, y) is formed from corresponding real or imaginary components from columns of the first row to determine angle A, then the corresponding (x, y) pairs of the second, and third row are rotated by angle A:

$$\begin{bmatrix} h_{11r} & h_{12r} + j*h_{12i} & h_{13r} + j*h_{13i} \\ h_{21r} & h_{22r} + j*h_{22i} & h_{23r} + j*h_{23i} \\ 0 & h_{32r} + j*h_{32i} & h_{33r} + j*h_{33i} \end{bmatrix} \quad (3)$$

After row rotation of (x, y) formed from corresponding real or imaginary components of first and second row:

$$\begin{bmatrix} h_{11r} & h_{12r} + j*h_{12i} & h_{13r} + j*h_{13i} \\ 0 & h_{22r} + j*h_{22i} & h_{23r} + j*h_{23i} \\ 0 & h_{32r} + j*h_{32i} & h_{33r} + j*h_{33i} \end{bmatrix} \quad (4)$$

After row rotation of sub-row [h22, h23] and [h32, h33]:

$$\begin{bmatrix} h_{11r} & h_{12r} + j*h_{12i} & h_{13r} + j*h_{13i} \\ 0 & h_{22r} & h_{23r} + j*h_{23i} \\ 0 & h_{32r} & h_{33r} + j*h_{33i} \end{bmatrix} \quad (5)$$

After cross-row transformation using (x, y) pairs formed from adjacent rows of real or imaginary components of 2×2 sub-matrix described above:

$$\begin{bmatrix} h_{11r} & h_{12r} + j*h_{12i} & h_{13r} + j*h_{13i} \\ 0 & h_{22r} & h_{23r} + j*h_{23i} \\ 0 & 0 & h_{33r} + j*h_{33i} \end{bmatrix} \quad (6)$$

After row rotation of element [h33]:

$$\begin{bmatrix} h_{11r} & h_{12r} + j*h_{12i} & h_{13r} + j*h_{13i} \\ 0 & h_{22r} & h_{23r} + j*h_{23i} \\ 0 & 0 & h_{33r} \end{bmatrix} \quad (7)$$

Thereby producing an upper triangular matrix with real diagonal elements, and suitable for an R matrix of a QR transformation from the H matrix, as will be described.

Although the examples of the present invention show a 3×3 matrix, it can be seen that the invention may be generalized to any dimension matrix.

QR decomposition of the H channel matrix is a crucial step in channel equalization. As the Q matrix is composed of orthogonal transformations (Givens rotations/row-vectoring operations are orthogonal transformations), the inverse of Q is the Hermitian transpose (complex conjugate-transpose) of Q. The following equation indicates the received signal as Y such as in a MIMO receiver, and Y is a function of the transmitted signal X, the channel impulse response (multiplicative noise) H and AWGN (additive noise) N in the frequency domain (capital letter notation is used for the below variables to represent frequency domain signals), and can be represented as follows, in post-QRD representation:

$$[Y]=[H][X]+[N] \quad (8)$$

$$[Y]=[Q][R][X]+[N] \quad (9)$$

Multiplying on either sides by $Q^H$, the hermitian transpose of Q, the equation transforms to $$[Q^H][Y]=[R][X]+[N] \quad (10)$$

The 802.11n standard provides a data driven channel estimation, such that a known training sequence is transmitted before any data is transmitted. The set of training sequences, called HT-LTFs, enable the receiver to estimate all the required data channels for successful demodulation by equalization of the spatial streams. Hence the channel estimation precedes data input to receiver, providing for estimation of phase equalization coefficients (Q & R) for further equalization.

During QRD operations a set of unitary transformations on H results in R. This can be shown as:

$$\begin{pmatrix} 1 & 0 & 0 \\ 0 & 1 & 0 \\ 0 & 0 & e^{-j\theta_{33}} \end{pmatrix} * \begin{pmatrix} 1 & 0 & 0 \\ 0 & \cos\phi_3 & \sin\phi_3 \\ 0 & -\sin\phi_3 & \cos\phi_3 \end{pmatrix} *$$

$$\begin{pmatrix} 1 & 0 & 0 \\ 0 & e^{-j\theta_{22}} & 0 \\ 0 & 0 & e^{-j\theta_{32}} \end{pmatrix} * \begin{pmatrix} \cos\phi_2 & \sin\phi_2 & 0 \\ -\sin\phi_2 & \cos\phi_2 & 0 \\ 0 & 0 & 1 \end{pmatrix} *$$

$$\begin{pmatrix} 1 & 0 & 0 \\ 0 & \cos\theta_1 & \sin\theta_1 \\ 0 & -\sin\theta_1 & \cos\theta_1 \end{pmatrix} * \begin{pmatrix} e^{-j\theta_{11}} & 0 & 0 \\ 0 & e^{-j\theta_{21}} & 0 \\ 0 & 0 & e^{-j\theta_{31}} \end{pmatrix} * H = R$$

The above sequence of steps can be written as $$D_3*G_3*D_2*G_2*G_1*D_1*H=R$$

Since Q and R are obtained by QR-decomposition of H $$H=[D_1^H*G_1^H*G_2^H*D_2^H*G_3^H*D_3^H]*R=Q*R$$

This indicates that all the angles in Gs and Ds are the composite angles for $Q^H$.

For phase equalizing the received data Y, these set of angles are applied back to the received signal matrix as shown below.

$$\begin{pmatrix} 1 & 0 & 0 \\ 0 & 1 & 0 \\ 0 & 0 & e^{-j\theta_{33}} \end{pmatrix} * \begin{pmatrix} 1 & 0 & 0 \\ 0 & \cos\phi_3 & \sin\phi_3 \\ 0 & -\sin\phi_3 & \cos\phi_3 \end{pmatrix} *$$

$$\begin{pmatrix} 1 & 0 & 0 \\ 0 & e^{-j\theta_{22}} & 0 \\ 0 & 0 & e^{-j\theta_{32}} \end{pmatrix} * \begin{pmatrix} \cos\phi_2 & \sin\phi_2 & 0 \\ -\sin\phi_2 & \cos\phi_2 & 0 \\ 0 & 0 & 1 \end{pmatrix} *$$

$$\begin{pmatrix} 1 & 0 & 0 \\ 0 & \cos\theta_1 & \sin\theta_1 \\ 0 & -\sin\theta_1 & \cos\theta_1 \end{pmatrix} * \begin{pmatrix} e^{-j\theta_{11}} & 0 & 0 \\ 0 & e^{-j\theta_{21}} & 0 \\ 0 & 0 & e^{-j\theta_{31}} \end{pmatrix} * Y = Q^H Y$$

The following pseudo code describes this transformation for an H matrix of dimension (max_row X max_col):

```
For col =1:max_col
  For row = max_row:col
    For int_col = col:max_col
      IF ( int_col == col )
        H'(row,col) = abs(H(row,col));
      Else
        H'(row,col) = H(row,int_col) *
  exp(-j * angle(H(row,int_col)));
      end
    End
  End
  // At the end of this loop the elements of column
  col are all non-negative real values
  For row = max_row-1:col
    For int_col = col:max_col
      If ( int_col == col )
        H'(row,col) = abs( H(row,col) + j
  * H(row+1,col) );
          // note that H(:,col) are all non-
  negative real after the first loop above
      else
        result1 = ( real( H(row,int_col) )
  + j * real( H(row+1,int_col) );
        result2 = ( imag( H(row,int_col) )
  + j * imag( H(row+1,int_col) );
        H'(row,int_col) = real(result1) +
  j * real(result2);
        H'(row+1,int_col) = imag(result1)
  + j * imag(result2);
      End
    End
  End
End
```

An example embodiment of the invention which performs the QR transformation is shown in FIG. 3A, where a 3×3 H matrix 400 has 9 complex values, each value represented with a real component and an imaginary component. The CORDIC engine iteratively operates on input values and transformed input values to generate an R matrix, as shown in FIG. 3B. For minimization of storage requirements, the input matrix may be placed in registers as shown in FIG. 3A, and the intermediate transformed values may be stored in separate storage, or the registers used to store the input matrix may be reused, since the transformed matrix has the same number of values to be stored as the input matrix. FIG. 3D through 3M show the progression of operations and values, with each individual matrix element noted with the suffix (c) for complex values and (r) for real values, such as those generated after transformation to a real value with no imaginary component. For example, h31(c) of FIG. 3D is a complex value shown in FIG. 3B clock 0 with h31r real component and h31i imaginary component. FIG. 3B shows the application of these values to the CORDIC engine, along with clock cycle values. In the particular pipeline configuration of FIGS. 2, 3 pipeline stages are present, so the latency between inputting a value for CORDIC engine processing and the outputting of the processed value is 3 clock cycles, such that the transformed (X', Y') value is generated 3 clock cycles after the (X,Y) input. For clarity, the source of the input values is shown parenthetically in FIG. 3B. For example, clock 0 input provides h31r(In) as the real component of h31, and h31i(In) as the imaginary component. After rotation to remove the imaginary component, the real-only component is output in clock 3 as h31r with no imaginary (Y') component. The blocks of input values which are sequentially provided and corresponding output values are shown in dashed line boundaries. Matrix third row values 402, matrix second row values 404, and matrix first row values 406 are successively input, which generates processed third row output 414 with angle A1 required to zero the Y component, processed second row output 416 which rotates by previously determined angle A1, and processed first row output 418, which rotates by previous determined angle A1. These processed values are stored in register memory 204, and later applied again to the input of the CORDIC engine, with the step which previously generated them shown in parenthesis. For example, FIG. 3B clock line 9 shows an input H21r(6r) and h31r(3r), which correspond to the real components of the 6th and 3rd clock output, respectively. The next block to be processed from intermediate results 408 produces outputs 420, which are used in the following block of inputs 412 which generate ouput values 454, which are in turn applied in 452 to generate output values 458.

FIG. 3D through 3K describe the step by step operation of the transformations performed by the CORDIC engine on a 3×3 matrix for the QR decomposition. Unless otherwise noted, each step represents the matrix contents at the beginning of the related step. FIG. 3D shows the 3×3 H matrix prior to operations, and the suffix (c) indicates a complex value, whereas after rotation to the real axis, the value becomes (r) indicating only a real value, and after translation along the real axis to 0 becomes a 0 value.

The first step of the transformation is shown in FIG. 3D with input values 402 of FIG. 3B, generating output values 414 shown in FIG. 3E, where the transformation performed on FIG. 3D is the rotation of the third row of the matrix [h31 h32 h33] by an angle A1 sufficient to reduce the imaginary component of h31 to 0, as shown by value h31(r) in FIG. 3E. The second and third steps perform the same rotational transformation by angle A2 for the second row about h21 and the third row by angle A3 about h11, thereby producing only real components to h21 and h11, as shown in FIG. 3F. The inputs of the second and third step are shown in FIG. 3B as 404 and 406, respectively, and generate output values 416 and 418, respectively, which values are stored in the register set for later use.

FIG. 4A shows additional detail of the first step, with FIG. 4B showing the initial x, y coordinates of a third row [h31(c) h32(c) h33(c)], where the first column element of the third row h31(c) is rotated by angle A1 to remove the imaginary (y) component of h31(c) by rotating it to the real axis and returning the required angle A1 with the CORDIC in VECTOR mode. As shown in FIG. 4C, after rotation to the real axis in the first step, steps two and three place the CORDIC in ROTATE mode and separately rotate h32(c) and h33(c), such that at the end of the third step, the entire row has been rotated to by angle A1 as shown in FIG. 4D.

The fourth step of the transformation is referred to herein as a "cross-row transformation", and is shown in FIG. 3F, and also in detailed FIGS. 4E and 4F. Corresponding pairs of real elements from each row and pairs of imaginary elements from each of rows 2 and 3 are provided to the CORDIC as (x, y) pairs as shown in FIGS. 4E and 4F, with the column 1 pair (h21(r), h31(r)) provided with the CORDIC in VECTOR mode to eliminate the Y component through rotation by angle A4. Angle A4 is then used with the CORDIC in ROTATE mode on the following pairs:

h22(r), h32(r);
h22(i), h32(i);
h23(r), h33(r);
h23(i), h33(i), where the above pairs can be rotated in any order once angle A4 is known. This (x, y) CORDIC input selection of adjacent row real values and imaginary values is also shown in FIGS. 4F and 4G, and the result of the cross-row transformation is to drive h31(r) to 0, generating the value shown in FIG. 3G. The cross-row transformation operation shown in FIGS. 3F, 4F, and 4G may also be understood in combination with the clocking diagram FIG. 3B, where the (x, y) input values of the second row and third row of FIG. 4F are provided as inputs to the CORDIC as shown in 408 of FIG. 3B, generating 3 pipeline delays later the output values 420 after rotation with angle of rotation A4.

With regard to the latency of the computation of angles A1, A2, A3, A4, etc, in VECTOR mode with regard to the use of the same angle in the following ROTATE stage cycle, it can be seen that during a VECTOR mode, a particular stage is computing a component of angle A1, etc, and in a following ROTATE cycle, the angle value computed in a previous VECTOR cycle is used without knowing the angle computed by any other stage in the pipeline, which does not create a race condition, even through the entire angle is not known until the full 3 pipeline stages have completed. For example, in clock 9, with the input (x, y) values set to the corresponding real components of the second and third row first column (h21(r), h31(r)), the first pipeline stage in VECTOR mode preserves the component of A4 which it has computed using the associated vector_angle_reg 108 of FIG. 1A, also shown as 202 in FIG. 2. At this same clock 9 moment, the complete angle A3 is available from the previous computation, which does not create a race condition because in ROTATE mode, each stage only needs the particular bit of angle value component computed from the preceding VECTOR mode.

The fifth step of FIG. 3G is the cross-row transformation described in step four, but operating on the first and second rows and rotating by angle A5 about the first column, thereby zeroing h21(r) as seen in output FIG. 3H. The CORDIC engine accepts inputs 410 and generates outputs 422 (with clock 21 output result shown on both FIGS. 3B and 3C for clarity).

The sixth and seventh steps of the transformation are shown in FIG. 3I, operating on each row of the 2×2 sub-matrix shown in dashed boundary. The third row of the 2×2 matrix is first rotated by an angle A6 about h32 to generate a real value for h32 and then the second row of the 2×2 matrix is rotated by angle A7 to generate a real value for h22, as shown in FIG. 3J. The sixth step is also shown in FIG. 3B input 412 which inputs the bottom row 412 and generates output 454 with angle A6 and seventh step top row input 450 which generates output 456 with angle A7. These two steps generate a first column of the 2×2 matrix with real values.

The eighth step is a cross-row transformation on the 2×2 sub-matrix shown in FIG. 3J, where the second and third row matrix pairs are rotated in VECTOR mode about h22r by angle A8 to zero out h32, generating the result shown in FIG. 3K. This is also shown in FIG. 3C as values 452 input to the CORDIC engine and generating rotated output values 458 accompanied by angle A8.

The ninth and final step of the transformation is shown in FIG. 3K, whereby element h33(c) is further rotated by angle A9 to zero out the imaginary component, thereby producing h33r of FIG. 3L. This is shown in FIG. 3C as input 460 which produces output 462 with rotation angle A9.

FIG. 3M shows the R matrix values (also shown in FIGS. 3B and 3C) which are formed through the 34 clock values of FIG. 3C. The values of the first transformed row [R11, R12, R13] are available at the end of step 5, the values of the second transformed row [0 R22 R23] are available at the end of step 8, and the third row [0 0 R33] is available at the end of step 9.

It is readily apparent that the number of pipeline stages shown in FIGS. 3B and 3C may be varied in accordance with the timing requirements. Because of pipeline delays in computing the subsequent element, the optimum number of pipeline stages may increase with the size of the matrix being processed. For example, when processing a small matrix with a CORDIC processor having a large number of pipeline stages, a long latency may result from waiting for processing to complete on earlier rows before those transformed rows are completed and can then be used in a subsequent transformation which relies on those row values. Unless limited by this latency, in general, a greater number of pipeline stages produces a faster throughput, whereas a smaller number of stages reduces the maximum operating frequency. For example, in the simplified case where no pipeline registers 224, 232, and 240 of FIG. 2 were used, FIG. 3B would have the "C real out" and "C im out" and "Ang_O" outputs shifted up in time by 3 clock cycles, such that input [H31r H31i] would generate rotated output [H31r' 0] at cycle 0, whereas it is currently shown in cycle 3.

The detailed illustration for QR decomposition using FIG. 2 and generating the results of FIG. 3A through 3C can be analogously produced using the zero-pipeline CORDIC engine of FIG. 5 (with the output values of FIG. 3B shifted up 3 clock cycles), or using the single stage reuse CORDIC engine of FIG. 6 (taking k clock cycles to produce each transformed H value). These are shown only for illustration in understanding the scope of the invention, and are not intended to limit the invention to only these configurations. Similarly, a 10 stage engine is shown in FIG. 2, which generates an angle A with 10 bits of accuracy, however a larger or smaller number of stages may be used to generate angles A with greater or lesser accuracy and granularity.

What is claimed is:

1. A CORDIC stage having an X input, a Y input, a sign input, a sign output, an X output, a Y output, a mode control input having a ROTATE or VECTOR value, and a stage number k input, said CORDIC stage having:

a first shift generating an output by shifting said Y input k times;

a second shift generating an output by shifting said X input k times;

a multiplexer having an output coupled to said sign input when said mode control input is ROTATE and to the sign of said Y input when said mode input is VECTOR, said sign of said Y input also forming said sign output;

a first multiplier forming the product of said first shift output and said multiplexer output;

a second multiplier forming the product of said second shift output and an inverted said multiplexer output;

a first adder forming said X output from the sum of said first multiplier output and said X input;

a second adder forming said Y output from the sum of said second multiplier output and said Y input.

2. The CORDIC of claim 1 where said sign is +1 when said Y input is greater than or equal to 0, and −1 at other times.

3. The CORDIC of claim 1 where said X input and said Y input are provided from either a register output or a CORDIC stage output.

4. The CORDIC of claim 1 where said X output and said Y output are provided to either a register input or a CORDIC stage output.

5. The CORDIC of claim 1 where at least one said shift operation is a right shift.

6. A CORDIC processor generating an X output and a Y output and having:
   a stage number input k, a mode input being either a VECTOR mode or a ROTATE mode, a sign input, an X input, and a Y input;
   when said mode input is ROTATE:
      said X output is the sum of said X input and the product of said sign input multiplied by a said Y input shifted k times;
      said Y output is the sum of said Y input and the product of said X input shifted k times multiplied by inverted said sign input;
   and when said mode input is VECTOR:
      said X output is the sum of said X input and the product of said Y input shifted said k times and multiplied by the sign of said Y input;
      said Y output is the sum of said Y input and the product of said X input shifted said k times and multiplied by the inverted sign of said Y input.

7. The CORDIC processor of claim 6 where said shift is a shift right by said k bits.

8. The CORDIC processor of claim 6 where said sign of said X input or said Y input is +1 if said X input or said Y input, respectively, is $\geq 0$ and said sign of said X input or said Y input is −1 if said X input or said Y input, respectively, is <0.

9. The CORDIC processor of claim 6 where a stage sign output is formed from the sign of said Y input.

10. The CORDIC processor of claim 6 where said k is a fixed stage number.

11. The CORDIC processor of claim 6 where said k is a variable stage number.

12. A CORDIC processor having:
   a plurality k of stages, each said stage having an X input, a Y input, an X output, a Y output, a mode input having the value VECTOR or ROTATE, a stage number input, a sign input, and a sign output;
   said first stage having said X input and said Y input coupled to a register selected by a controller; said k stage X output and Y output generating a result coupled to said register selected by said controller, each said k through k−1 stage X output and each said k through k−1 stage Y output coupled to a respective successive k+1 through k stage said X input and said Y input;
   said controller generating said mode input for each said stage, said controller also having an angle register for storing an angle formed from each said stage sign output during said VECTOR mode and providing said angle register to said stage sign inputs during said ROTATE mode;
   where, for each said stage, when said mode input is ROTATE:
      said X output is the sum of said X input and the product of said sign input multiplied by a said Y input shifted k times;
      said Y output is the sum of said Y input and the product of said X input shifted k times multiplied by inverted said sign input;
   and for each said stage, when said mode input is VECTOR:
      said X output is the sum of said X input and the product of said Y input shifted said k times and multiplied by the sign of said Y input;
      said Y output is the sum of said Y input and the product of said X input shifted said k times and multiplied by the inverted sign of said Y input.

13. The CORDIC of claim 12 where said sign is +1 when said Y input is greater than or equal to 0, and −1 at other times.

14. The CORDIC of claim 12 where said VECTOR mode results in the computation of an angle associated with said first stage (X input, Y input), said angle stored in said angle register.

15. The CORDIC of claim 12 where said ROTATE mode causes the rotation of said first stage(X input, Y input) by the value of an angle stored in said angle register.

16. The CORDIC of claim 12 where a pipeline register storing a k stage X output and Y output is included in one or more said stages.

17. The CORDIC of claim 12 where said k stage includes a scale factor operative on said X output and said Y output.

18. The CORDIC of claim 12 where an angle of rotation required to reduce the magnitude of Y to $\frac{1}{2}^k$ of a previous value is saved in said angle register during said VECTOR mode.

19. The CORDIC of claim 12 where, in said ROTATE mode, said first stage (X input, and Y input) is rotated to form said k stage (X output, Y output), and the amount of rotation is determined by the contents of said angle register.

20. A CORDIC processor having:
   a plurality of CORDIC stages, each said CORDIC stage having an X input, a Y input, a mode control input, a stage number input, a sign input, a sign output, an X output, and a Y output;
   a register memory containing a plurality of real and imaginary values forming value pairs for rotation, said value pairs forming elements of a matrix;
   a mode controller generating a plurality of mode control outputs, one for each said CORDIC stage;
   a first stage having an X input and a Y input coupled to said register memory and also to a k=1 stage value;
   a second stage having an X input and a Y input coupled to said first stage X output and Y output, respectively, said second stage also coupled to a k=2 stage value;
   a third stage having an X input and a Y input coupled to said second stage X output and Y output, respectively, said third stage also coupled to a k=3 stage value;
   a first pipeline register coupled to said third stage X output and Y output, said first pipeline register generating an X output and Y output, respectively, on a clock transition;
   a fourth stage having an X input and a Y input coupled to said first pipeline register and also to a k=4 stage value;
   a fifth stage having an X input and a Y input coupled to said fourth stage X output and Y output, respectively, said fifth stage also coupled to a k=5 stage value;
   a sixth stage having an X input and a Y input coupled to said fifth stage X output and Y output, respectively, said sixth stage also coupled to a k=6 stage value;
   a second pipeline register coupled to said sixth stage X output and Y output, said second pipeline register generating an X output and Y output, respectively, on a clock transition;

a seventh stage having an X input and a Y input coupled to said sixth stage X output and Y output, respectively, said seventh stage also coupled to a k=7 stage value;

an eighth stage having an X input and a Y input coupled to said seventh stage X output and Y output, respectively, said seventh stage also coupled to a k=8 stage value;

a ninth stage having an X input and a Y input coupled to said eighth stage X output and Y output, respectively, said ninth stage also coupled to a k=9 stage value;

a third pipeline register coupled to said ninth stage X output and Y output, said third pipeline register generating an X output and Y output, respectively, on a clock transition;

a tenth stage having an X input and Y input coupled to said third pipeline stage X output and Y output, respectively, said tenth stage also coupled to a k=10 stage value;

a scale stage coupled to said tenth stage X and Y outputs, scaling each output by a scalar constant, and delivering a scaled X and Y value to said register memory;

said first stage, second stage, and third stage controlled by a first mode value, said fourth stage, said fifth stage, and said sixth stage controlled by a second mode value, said seventh stage, said eighth stage, and said ninth stage controlled by a third mode value, and said tenth stage controlled by a fourth mode value.

21. The processor of claim 20 where each said CORDIC stage has:

a first shift generating an output by shifting said Y input k times;

a second shift generating an output by shifting said X input k times;

a multiplexer having an output coupled to said sign input when said mode control input is ROTATE and to the sign of said Y input when said mode input is VECTOR, said sign of said Y input also forming said sign output;

a first multiplier forming the product of said first shift output and said multiplexer output;

a second multiplier forming the product of said second shift output and an inverted said multiplexer output;

a first adder forming said X output from the sum of said first multiplier output and said X input;

a second adder forming said Y output from the sum of said second multiplier output and said Y input.

* * * * *